United States Patent Office 3,701,773
Patented Oct. 31, 1972

1

3,701,773
5-NITROFURYL NITRONES

Shinsaku Minami, Yamatokouriyama-shi, Jun-ichi Matsumoto, Osaka, Masanao Shimizu, Kobe, and Yoshiyuki Takase, Amagasaki-shi, Japan, assignors to Dainippon Pharmaceutical Co., Ltd., Osaka, Japan No Drawing. Continuation-in-part of application Ser. No. 592,265, Nov. 7, 1966. This application July 23, 1968, Ser. No. 746,749
Claims priority, application Japan, Nov. 6, 1960, 40/68,196; July 27, 1967, 42/48,362
Int. Cl. C07d *5/30*
U.S. Cl. 260—240 A 42 Claims

ABSTRACT OF THE DISCLOSURE

Nitrone derivatives having anti-microbial activity comprising compounds of the formula

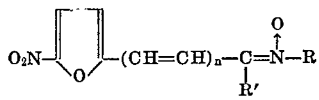

wherein *n* is 0 or 1; R is a substituted or unsubstituted alkyl radical having 1 to 6 carbon atoms, a substituted or unsubstituted phenyl radical, or a substituted or unsubstituted heterocyclic radical; and R′ is hydrogen or an alkyl radical of 1 to 4 carbon atoms.

Such nitrone derivatives are prepared by condensing carbonyl compounds of the formula

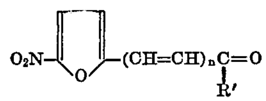

with an N-substituted hydroxylamine of the formula

HONH—R wherein *n*, R, and R′ have the meaning set forth above.

This application is a continuation-in-part of copending application Ser. No. 592,265, filed Nov. 7, 1966, now abandoned.

The present invention is directed to novel nitrone derivatives having excellent antimicrobial activity; a method of preparing the same; and medicinal compositions containing the same.

Heretofore, some of the N-substituted (5-nitro-2-furfurylidene) amine compounds have been known as substances having antimicrobial activity. It has been noticed, however, that the antimicrobial activities of many of these compounds are not high enough to be satisfactory.

The principal object of the present invention therefore

2 is to offer a novel compound having excellent antibacterial, antifungal and antiprotozoal activities.

A further specified object of the present invention is to offer nitrone derivatives useful as medicines and veterinary medicines and in the fields of food and agriculture, and the method for the preparation thereof.

Still other objects and advantages of the present invention will be more apparent from the following description of the present invention.

The present invention relates to nitrone derivatives represented by the general formula:

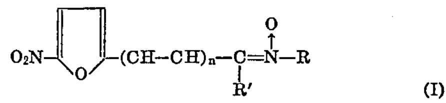

(wherein *n* is 0 or 1; R is a substituted or unsubstituted alkyl radical having 1 to 6 carbon atoms, a substituted or unsubstituted phenyl radical, or a substituted or unsubstituted heretocyclic radical; and R′ is hydrogen or an alkyl radical having 1 to 4 carbon atoms).

More particularly, R is selected from members of the group A–X, P–Y and a heterocyclic radical wherein A is an alkyl radical having 1 to 6 carbon atoms; P is a phenyl radical; X is a member selected from hydrogen, an hydroxyl radical, an alkoxy radical having 1 to 4 carbon atoms, a phenyl radical, a halogen atom, an alkoxy carbonyl radical (wherein the alkoxy portion has from 1 to 4 carbon atoms), a carbamoyl radical, a nitro radical, a sulfoxy ($HOSO_2$—) radical, an alkali metal oxy-sulfonyl radical (an $MOSO_2$— radical wherein M is an alkali metal), a heterocyclic radical or an amine radical of the formula $$-N\begin{matrix} R_2 \\ R_3 \end{matrix}$$

wherein $R_2$ and $R_3$ are each members selected from hydrogen, alkyl radicals of 1 to 4 carbon atoms, a phenyl radical and a heterocyclic radical; Y is a member selected from hydrogen, an alkyl radical having 1 to 4 carbon atoms, a halogen atom, an hydroxyl radical, an OM radical (wherein M represents an alkali metal), an alkanoyloxy radical having 1 to 4 carbon atoms, an aroyloxy radical, an alkoxy radical having 1 to 4 carbon atoms, an alkanoyl radical having 1 to 4 carbon atoms, an alkanoylamino radical having 1 to 4 carbon atoms, a carboxyl radical or its alkali metal salt, an alkoxycarbonyl radical having 1 to 4 carbon atoms, a carbamoyl radical which may be substituted by a phenyl radical or an alkyl radical having 1 to 4 carbon atoms, a sulfamoyl radical, a sulfoxyl radical, a cyano radical, or a trifluoromethyl radical.

Further, the heterocyclic radicals represented above are preferably radicals of 5- or 6-membered compounds which contain in the ring at least one atom O, S or N as the hetero-atom. The heterocyclic-radical may be fused to a further ring system, and radical may contain a substituent, such as a lower alkyl radical or a lower alkoxy radical.

To exemplify suitable members for R in the above general Formula I the following are mentioned: methyl, ethyl n- and iso-propyl, 1-methyl-2-hydroxyethyl, 2-hydroxyethyl, 2-hydroxypropyl, 2-hydroxy-1-(hydroxymethyl)ethyl, 2-methoxyethyl, benzyl, chloromethyl, ethoxycarbonylmethyl, carbamoylmethyl, 1,1-methyl-2-nitroethyl, sodioxysulfonylpropyl, 1,1-dimethyl-2-N,N-dimethylaminoethyl, 1,1-dimethyl-2-piperidinoethyl, 1,1-dimethyl-2-morpholinoethyl, 1,1-dimethyl-2-N-isopropyl-aminoethyl, 1,1-dimethyl-2-anilinoethyl, 1,1-dimethyl-2-(3-pyridylamino)ethyl, phenyl, 4-methylphenyl, 4-chlorophenyl, 4-iodophenyl, 3,4-dichlorophenyl, 4-hydroxyphenyl, 4-sodioxyphenyl, 4-acetoxyphenyl, 4-benzoyloxyphenyl, 2-, 3-, or 4-methoxyphenyl, 4-ethoxyphenyl, 4-acetylphenyl, 4-acetamidophenyl, 2-, 3-, or 4-carboxyphenyl, 3-, or 4-sodioxycarbonylphenyl, 4-methoxycarbonylphenyl, 4-carbamoylphenyl, 4-methylcarbamoylphenyl, 4-sulfamoylphenyl, 4-sulfoxyphenyl, 4-cyanophenyl, 3-trifluoromethylphenyl, 5-benzimidazolyl, 6-quinolyl, 4-salicyloyloxyphenyl, and 5-benzotriazolyl.

R′ in the above general Formula I is preferably a hydrogen atom or a methyl radical.

The following are exemplary especially suitable compounds of the present invention:

α-(5-nitro-2-furyl)-N-methylnitrone,
α-(5-nitro-2-furyl)-N-ethylnitrone,
α-(5-nitro-2-furyl)-N-propylnitrone,
α-(5-nitro-2-furyl)-N-isopropylnitrone,
α-(5-nitro-2-furyl)-N-(1-methyl-2-hydroxyethyl)nitrone,
α-(5-nitro-2-furyl)-N-(2-hydroxyethyl)nitrone,
α-(5-nitro-2-furyl)-N-(2-hydroxypropyl)nitrone,
α-(5-nitro-2-furyl)-N-[2]hydroxy-1-(hydroxymethyl)ethylnitrone,
α-(5-nitro-2-furyl)-N-(1,1-dimethyl-2-hydroxyethyl)nitrone,
α-(5-nitro-2-furyl)-N-(1,1-dihydroxymethyl-2-hydroxyethyl)nitrone,
α-(5-nitro-2-furyl)-N-ethoxycarbonylmethyl nitrone,
α-(5-nitro-2-furyl)-N-(carbamoylmethyl)nitrone,
α-(5-nitro-2-furyl)-N-(1-methyl-2-nitroethyl)nitrone,
α-(5-nitro-2-furyl)-N-(2-sodioxysulfonylpropyl)nitrone,
α-(5-nitro-2-furyl)-N-(1,1-dimethyl-2-dimethyl-aminoethyl)nitrone,
α-5-(nitro-2-furyl)-N-phenylnitrone,
α-(5-nitro-2-furyl)-N-(4-methoxyphenyl)nitrone,
α-(5-nitro-2-furyl)-N-(3-methoxyphenyl)nitrone,
α-(5-nitro-2-furyl)-N-(2-methoxyphenyl)nitrone,
α-(5-nitro-2-furyl)-N-(4-ethoxyphenyl)-nitrone,
α-(5-nitro-2-furyl)-N-(4-tolyl)nitrone,
α-(5-nitro-2-furyl)-N-(3-trifluoromethylphenyl)nitrone,
α-(5-nitro-2-furyl)-N-(4-chlorophenyl)nitrone,
α-(5-nitro-2-furyl)-N-(3,4-dichlorophenyl)-nitrone,
α-(5-nitro-2-furyl)-N-(4-iodophenyl)nitrone,
α-(5-nitro-2-furyl)-N-(4-carboxyphenyl)nitrone,
α-(5-nitro-2-furyl)-N-(3-carboxyphenyl)nitrone,
α-(5-nitro-2-furyl)-N-(2-carboxy-phenyl)nitrone'),
α-(5-nitro-2-furyl)-N-(4-methoxycarbonylphenyl)nitrone,
α-(5-nitro-2-furyl)-N-(4-carbamoylphenyl)nitrone,
α-(5-nitro-2-furyl)-N-(4-cyanophenyl)nitrone,
α-(5-nitro-2-furyl)-N-(4-sulfamoylphenyl)nitrone,
α-(5-nitro-2-furyl)-N-(2,3-dicarboxyphenyl)nitrone,
α-(5-nitro-2-furyl)-N-(2-anilino-1,1-dimethylethyl)nitrone,
α-(5-nitro-2-furyl)-N-(5-benzimidazolyl)nitrone,
α-(5-nitro-2-furyl)-N-(6-quinolyl)nitrone,
α-(5-nitro-2-furyl)-N-(4-sodioxycarbonylphenyl)nitrone,
α-(5-nitro-2-furyl)-N-(4-salicyloyloxyphenyl)nitrone,
α-(5-nitro-2-furyl)-N-(5-benzotriazolyl)nitrone,
α-[2-(5-nitro-2-furyl)vinyl]-N-(1-hydroxymethylethyl)nitrone,
α-[2-(5-nitro-2-furyl)vinyl]-N-(2-hydroxyethyl)nitrone,
α-[2-(5-nitro-2-furyl)vinyl]-N-(1,1-dihydroxymethyl-2-hydroxyethyl)nitrone,
α-[2-(5-nitro-2-furyl)vinyl]-N-(2-hydroxypropyl)nitrone,
α-[2-(5-nitro-2-furyl)vinyl]-N-(1,1-dimethyl-2-hydroxyethyl)nitrone,
α-[2-(5-nitro-2-furyl)vinyl]-N-(1,1-dimethyl-2-dimethylaminoethyl)nitrone,
α-[2-(5-nitro-2-furyl)vinyl]-N-(2-isopropylamino-1,1-dimethylethyl)nitrone hydrochloride,
α-(5-nitro-2-furyl)-N-(6-benzothiazolyl)nitrone,
α-(5-nitro-2-furyl)-N-(6-methoxy-8-quinolyl)nitrone,
α-(5-nitro-2-furyl)-N-(1,1-dimethyl-2-piperidinoethyl)nitrone,
α-(5-nitro-2-furyl)-N-(1,1-dimethyl-2-morpholinoethyl)nitrone,
α-(5-nitro-2-furyl)-N-[1,1-dimethyl-2-(3-pyridylamino)ethyl]nitrone,
α-[2-(5-nitro-2-furyl)-vinyl]-N-methylnitrone,
α-[2-(5-nitro-2-furyl)-vinyl]-N-(6-benzothiozolyl)nitrone,
α-[2-(5-nitro-2-furyl)-vinyl]-N-(5-benzimidazolyl)nitrone,
α-[2-(5-nitro-2-furyl)-vinyl]-N-(6-quinolyl)nitrone,
α-[2-(5-nitro-2-furyl)vinyl]-N-(3-carboxyphenyl)nitrone,
α-[2-(5-nitro-2-furyl)-vinyl]-N-(4-sulfamoylphenyl)nitrone,
α-methyl-α-(5-nitro-2-furyl)-N-methylnitrone,
α-methyl-α-(5-nitro-2-furyl)-N-ethylnitrone,
α-methyl-α-(5-nitro-2-furyl)-N-(2-hydroxyethyl)nitrone,
α-methyl-α-(5-nitro-2-furyl)-N-(2-hydroxypropyl)nitrone can be mentioned.

According to the present invention, the novel compounds can be easily prepared by contacting a carbonyl compound represented by the general formula:

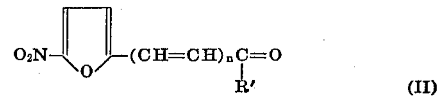

(wherein $n$ and R′ have the above-defined meanings) with an N-substituted hydroxylamine represented by the general formula:

$$\mathrm{HONH{-}R} \qquad \text{(III)}$$

(wherein R has the above-defined meaning).

In this case, by contacting the carbonyl compound with the N-substituted hydroxylamine, a condensation reaction easily proceeds with dehydration. This reaction may be carried out in an organic solvent, such as a lower alcohol, e.g., methanol or ethanol, dioxane, tetrahydrofuran, dimethylsulfoxide and pyridine.

In the case of the use of 5-nitrofurfural [R′ and $n$ in the Formula II are hydrogen atom and O, respectively] a solvent need not be employed.

The reaction temperature used differs according to the kinds of the reactants and the solvent used, but generally speaking, a temperature within the range of 10 to 100° C. is preferable. The reaction pressure is a less important factor, and atmospheric pressure is usually preferable.

The N-substituted hydroxylamines, specified in the method of the present invention, are not only the free forms but also salt forms with mineral acids can be utilized. As such salts of mineral acid, the hydrochloride, sulphate, etc., can be utilized. In the case, a salt of a mineral acid is used, it is desirable that a base in an amount sufficient to neutralize the acid, such as an inorganic base, e.g., sodium hydroxide, potassium hydroxide, sodium bicarbonate, potassium bicarbonate, sodium carbonate or potassium carbonate, or an organic base, e.g., sodium acetate, pyridine or triethylamine, be added to the reaction system.

The important features of the present invention consist in the discovery that a carbonyl derivative of nitrofuran readily reacts with an N-substituted hydroxylamine to form novel nitrone derivatives and that these novel nitrone derivatives have greater antimicrobial activities when compared with such Schiff bases as known N-substituted (5-nitro-2-furfurylidene) amine derivatives similar in chemical structure to the compounds of the present invention. In addition, the compounds of the present invention are superior to the Schiff bases in their solubilities in water and organic solvents so that they are more advantageous in application for liquid medicines.

The novel compounds of the present invention are remarkably effective against diseases due to micro-organisms such as bacteria, fungi and protozoa. Since they have a strong activity, a relatively small dose is sufficient, and the toxicity is less than those of known nitrofuran derivatives. They can be applied to human beings and other animals as an internal medicine, external medicine or an injection in the present form, in the form of a solution, or together with an adjuvant, carrier or vehicle. Further, it is to be understood that the compounds of the present invention are widely applicable to the fields of food, agriculture, etc. where the removal or prevention of increase of micro-organisms is required.

The present invention is further illustrated by the following non-limitative examples:

EXAMPLE 1

To a solution of 5.7 g. of 5-nitrofurfural and 3.35 g. of N-methylhydroxylamine hydrochloride in 10 ml. of ethanol was added a solution of 3.28 g. of anhydrous sodium acetate in 4 ml. of water. The mixture was heated for 10 minutes on a steam bath, and cooled. A resulting precipitate was collected by filtration, washed with water, and recrystallized from ethanol to give 5.0 g. of α-(5-nitro-2-furyl)-N-methylnitrone (compound 1) as yellow needles melting at 165–166° C.

EXAMPLE 2

(A) To a solution of 5.64 g. of 5-nitrofurfural and 3.9 g. of N-ethylhydroxylamine hydrochloride was added dropwise with stirring an aqueous, saturated solution of 3.28 g. of anhydrous sodium acetate. The mixture was heated on a steam-bath for 10 minutes, and then cooled. A resulting precipitate was collected by filtration, washed with water, and recrystallized from ethanol to give 4.5 g. of α-(5-nitro-2-furyl)-N-ethylnitrone (compound 2) as yellow needles melting at 175–177° C.

(B) In the absence of sodium acetate, a solution of 5.64 g. of 5-nitrofurfural and 3.9 g. of N-ethylhydroxylamine hydrochloride was heated on a steam bath for 10 minutes. Then the reaction mixture was treated as described above. There was obtained 3.0 g. of α-(5-nitro-2-furyl)-N-ethylnitrone. This compound was an infrared spectrum identical with that of the compound described under (A) above and shows no depression of the mixed melting point with that compound.

EXAMPLES 3–4

To a stirred solution of 2.2 g. of N-propylhydroxylamine hydrochloride in 20 ml. of ethanol was added 1.6 g. of anhydrous sodium acetate and then 2.8 g. of 5-nitrofurfural. The resulting mixture was allowed to stand with stirring at room temperature for 5 hours. A precipitate, after addition of water, was filtered, washed with water, and then recrystallized from a mixture of ethanol and n-hexane to yield 3 g. of α-(5-nitro-2-furyl)-N-propylnitrone (compound 3) as yellow scales melting at 82–83° C.

On the same treatment of 5-nitrofurfural, N-isopropylhydroxyamine hydrochloride and anhydrous sodium acetate there was obtained α-(5-nitro-2-furyl)-N-isopropylnitrone (compound 4) as yellow scales melting at 103–104° C.

EXAMPLE 5

To a stirred solution of 2.1 g. of N-(1-methyl-2-hydroxyethyl)-hydroxylamine hydrochloride in 10 ml. of ethanol was added 1.6 g. of anhydrous sodium acetate and then 2.8 g. of 5-nitrofurfural. The mixture was allowed to stand with stirring at room temperature for 2 hours. After filtration of an insoluble material, the filtrate was concentrated to dryness in reduced pressure and the resulting residue was repeatedly extracted with chloroform. The extracts were dried over anhydrous sodium sulfate and followed by evaporation of chloroform. Recrystallization of the residual solid from ethyl acetate gave 9.1 g. of α-(5-nitro-2-furyl)-N-(1-methyl-2-hydroxyethyl) nitrone (compound 5) as yellow needles melting at 135–136° C.

EXAMPLES 6–8

Following compounds were also prepared from the given reactants by the same method mentioned under Example 5:

From 5-nitrofurfural, N - (2 - hydroxyethyl)hydroxyamine hydrochloride and anhydrous sodium acetate there was obtained α - (5 - nitro-2-furyl)-N-(2-hydroxyethyl) nitrone (compound 6) as yellow needles melting at 151–152° C.

From 5 - nitrofurfural, N-(2-hydroxypropyl)hydroxylamine hydrochloride and anhydrous sodium acetate there was obtained α - (5-nitro-2-furyl)-N-(2-hydroxypropyl) nitrone (compound 7) as yellow scales melting at 147–149° C.

From 5-nitrofurfural, N - [2 - hydroxy - 1(hydroxymethyl)ethyl] - hydroxylamine hydrochloride and sodium acetate there was obtained α-(5-nitro-2-furyl)-N-[2-hydroxyl-1-(hydroxymethyl)ethyl]nitrone (compound 8) as yellow scales melting at 138–139° C.

EXAMPLE 9

To a solution of 4.4 g. of N-phenylhydroxylamine in 10 ml. of ethanol was added 5.7 g. of 5-nitrofurfural and the resulting mixture was allowed to stand at room temperature with occasional shaking. After one hour, during which time yellow crystals precipitated, the resulting crystals were collected by filtration and washed with methanol. Recrystallization of the product from ethanol formed 9.5 g. of α-(5-nitro-2-furyl)-N-phenylnitrone (compound 9) as yellow prisms melting at 180–181° C.

EXAMPLE 10

To a solution of 1.4 g. of N-(4-methoxyphenyl)hydroxylamine in 20 ml. of ethanol was added dropwise a solution of 1.4 g. of 5-nitrofurfural in 5 ml. of ethanol. The mixture was allowed to stand with stirring at room temperature for 30 minutes. An orange solid precipitated during this period was collected by filtration, washed with cold ethanol, and then recrystallized from ethanol to give 1.4 g. of a α-(5-nitro-2-furyl) - N - (4 - methoxyphenyl) nitrone (compound 10) as orange needles melting at 172–193° C.

EXAMPLES 11–29

Following compounds were further prepared from the given reactants by the same method described in Example 10.

From 5-nitrofurfural and N -(3 - methoxyphenyl)hydroxylamine there was obtained α-(5-nitro-2-furyl)-N-(3-methoxyphenyl)nitrone (compound 11) as yellow prisms melting at 161.5–162.5° C.

From 5-nitrofurfural and N - (2 - methoxyphenyl)hydroxylamine there was obtained α-(5-nitro-2-furyl)-N-(2- methoxyphenyl)nitrone (compound 12) as orange needles melting at 164.5–165.5° C.

From 5-nitrofurfural and N-(4-ethoxyphenyl)hydroxylamine there was obtained α-(5-nitro-2-furyl) - N - (4-ethoxyphenyl)nitrone (compound 13) as orange needles melting at 153–154° C.

From 5-nitro-furfural and N - (4 - tolyl)hydroxylamine there was obtained α-(5-nitro-2-furyl)-N-(4-tolyl)nitrone (compound 14) as yellow needles melting at 159.5–160.5° C.

From 5-nitrofurfural and N-(3-trifluoromethylphenyl) hydroxylamine there was obtained α-(5-nitro-2-furyl)-N-(3-trifluoromethylphenyl)nitrone (compound 15) as yellow prisms melting at 142–143° C.

From 5-nitrofurfural and N-(4-chlorophenyl)hydroxylamine there was obtained α-(5-nitro-2-furyl)-N-(4-chlorophenyl)nitrone (compound 16) as orange needles melting at 165–166° C.

From 5 - nitrofurfural and 6-(3,4-dichlorophenyl)hydroxylamine there was obtained α-(5-nitro-2-furyl)-N-(3,4-dichlorophenyl)nitrone (compound 17) as yellow needles melting at 202–204° C.

From 5-nitrofurfural and 6 - (4-iodophenyl)hydroxylamine there was obtained α-(5-nitro-2-furyl)-N-(4-iodophenyl)nitrone (compound 18) as yellow needles melting at 187–189° C.

From 5-nitrofurfural and N-(4-carboxyphenyl)hydroxylamine there was obtained α-(5-nitro-2-furyl)-N-(4-carboxyphenyl)nitrone (compound 19) as yellow needles melting at 238–241° C. with decomposition.

From 5-nitrofurfural and N-3-(carboxyphenyl)hydroxylamine there was obtained α-(5-nitro-2-furyl)-N-(3-carboxyphenyl)nitrone (compound 20) as yellow needles melting at 218–220° C. with decomposition.

From 5-nitrofurfural and N-(2-carboxyphenyl)hydroxylamine there was obtained α-(5-nitro-2-furyl)-N-(2-carboxyphenyl)nitrone (compound 21) as orange needles melting at 149–151° C. with decomposition.

From 5-nitrofurfural and N-(4-methoxycarbonylphenyl)hydroxylamine there was obtained α-(5-nitro-2-furyl)-N-(4-methoxycarbonylphenyl)nitrone (compound 22) as yellow needles melting at 176–177° C.

From 5-nitrofurfural and N-(4-carbamoylphenyl)hydroxylamine there was obtained α-(5-nitro-2-furyl)-N-(4-carbamoylphenyl)nitrone (compound 23) as yellow needles melting at 230–232° C. with decomposition.

From 5-nitrofurfural and N-(4-cyanophenyl)hydroxylamine there was obtained α-(5-nitro-2-furyl)-N-(4-cyanophenyl)nitrone (compound 24) as yellow needles melting at 198–199° C.

From 5-nitrofurfural and N-(4-sulfamoylphenyl)hydroxylamine there was obtained α-(5-nitro-2-furyl)-N-(4-sulfamoylphenyl)nitrone (compound 25) as yellow needles melting at 210° C. with decomposition.

From 5-nitrofurfural and N-(5-benzimidazolylhydroxylamine there was obtained α-(5-nitro-2-furyl)-N-(5-benzimidazolyl)nitrone (compound 26) as orange needles melting at 230° C. with decomposition.

From 5-nitrofurfural and N-(5-benzimidazolylhydroxylamine there was obtained α-(5-nitro-2-furyl)-N-(5-benzimidazolyl)nitrone (compound 26) as orange needles melting at 230° C. with decomposition.

From 5-nitrofurfural and N-(4-salicyloyloxyphenyl)hydroxylamine there was obtained α-(5-nitro-2-furyl)-N-(4-salicyloyloxyphenyl)nitrone (compound 28) as yellow needles melting at 210–212° C. with decomposition.

From 5-nitrofurfural and N-(5-benzotriazolyl)hydroxyl)amine there was obtained α-(5-nitro-2-furyl)-N-(5 - benzotriazolyl)nitrone (compound 29) as yellow needles melting above 360° C.

EXAMPLE 30

To a suspension of 1.38 g. of α-(5-nitro-2-furyl)-N-(4-carboxyphenyl)nitrone in 8 ml. of water was added 2 ml. of an aqueous solution of 0.42 g. of sodium bicarbonate. The mixture was warmed on a steam bath to result in a clear solution, and then chilled. A resulting solid was collected by filtration washed with cold water, and recrystallized from water to form 1.0 g. of α-(5-nitro-2-furyl) - N - (4 - sodioxycarbonylphenyl)nitrone (compound 30) as yellow needles decomposing above 365° C.

EXAMPLE 31

To a solution of 1.67 g. of β-(5-nitro-2-furyl)acrolein and 1.0 g. of N-methylhydroxylamine hydrochloride in 45 ml. of ethanol was added an aqueous, saturated solution of anhydrous sodium acetate. The mixture was allowed to stand for 30 minutes with occasional shaking, warmed on a steam bath for 20 minutes, and then filtered to remove a resulted sodium chloride. After cooling, the resulted crystals were collected by filtration, washed with water and recrystallized from ethanol to give 1.3 g. of α-[2-(5-nitro-2-furyl)vinyl]-N-methyl-nitrone (compound 31) as reddish orange needles melting at 180–182° C.

EXAMPLE 32

To a solution of 1.53 g. of 3-carboxyphenylhydroxylamine in 50 ml. of ethanol was added, with stirring, 1.67 g. of β-(5-nitro-2-furyl)acrolein and 2 ml. of acetic acid. The reaction took place immediately. The mixture was heated on a steam bath for 45 minutes with occasional shaking. After cooling, the resulted solid was collected by filtration and recrystallized from dioxane to give 1.5 g. of α-[2-(5-nitro-2-furyl)vinyl]-N-(3-carboxyphenyl)nitrone (compound 32) as dark orange prisms, beginning to decompose above 125° C. without melting.

EXAMPLE 33

(A) A mixture of 1.55 g. of 5-nitro-2-furyl methylketone, 1.0 g. of N-methylhydroxylamine hydrochloride and 1.0 g. of pyridine in 20 ml. of ethanol was refluxed for 2 hours on a steam bath. After evaporation of the solvent, the residue was cooled to form orange crystals which were collected by filtration and recrystallized from ethanol to give 1.3 g. of α-methyl-α-(5-nitro-2-furyl)-N-methylnitrone (compound 33) as reddish yellow needles melting at 179–180° C.

(B) A use of 10 ml. of only pyridine, in place of ethanol under (A) above mentioned, as both the solvent and the acceptor of hydrogen chloride and the treatment of the reaction mixture by the same manner resulted again in a formation of 1.4 g. of the identical product with that obtained previously under (A).

EXAMPLES 34–36

Following compounds were further prepared from the given reactants by the same method as described in Example 1.

From 5-nitro-2-furyl methylketone and N-ethylhydroxylamine hydrochloride there was obtained α-methyl-α-(5-nitro-2-furyl)-N-ethylnitrone (compound 34) as yellow needles melting at 158–160° C.

From 5-nitro-2-furyl methylketone and N-(2-hydroxypropyl)-hydroxylamine hydrochloride there was obtained α-methyl-α-(5-nitro-2-furyl)-N-(2-hydroxypropyl)nitrone (compound 35) as yellow needles melting at 150–151.5° C.

From 5-nitro-2-furyl methylketone and N-(2-hydroxyethyl)-hydroxylamine hydrochloride there was obtained α-methyl-α-(5-nitro-2-furyl)-N-(2 - hydroxyethyl)nitrone (compound 36) as yellow needles melting at 137–138° C.

EXAMPLES 37–40

Following compounds were further prepared from the given reactants by the same method as described in Example 5.

From 5-nitrofurfural and N-(1,1-dimethyl-2-hydroxyethyl)-hydroxylamine hydrochloride there was obtained α-(5-nitro-2-furyl) - N - (1,1-dimethyl-2-hydroxyethyl) nitrone (compound 37) as yellow needles melting at 135–137° C.

From 5-nitrofurfural and N-(1,1-dihydroxymethyl-2-hydroxyethyl) hydroxylamine hydrochloride there was obtained α-(5-nitro-2-furyl)-N-(1,1 - dihydroxymethyl-2-hydroxyethyl)nitrone (compound 38) as yellow needles melting at 172–173° C.

From 5-nitrofurfural and N-(ethoxycarbonylmethyl) hydroxylamine hydrochloride there was obtained α-(5-nitro-2-furyl) - N - (ethoxycarbonylmethyl)nitrone (compound 39) as yellow needles melting at 114–115° C.

From 5-nitrofurfural and N-(carbamoylmethyl)hydroxylamine hydrochloride there was obtained α-(5-nitro-2-furyl)-N-(carbamoylmethyl)nitrone (compound 40) as yellow needles melting at 189–191° C.

EXAMPLES 41–45

Following compounds were further prepared from the given reactants by the same method as described in Example 10.

From 5-nitrofurfural and N-(2,3-dicarboxyphenyl)hydroxylamine there was obtained α-(5-nitro-2-furyl)-N-(2,3-dicarboxyphenyl)nitrone (compound 41) as yellow needles melting at 225–227° C. with decomposition.

From 5-nitrofurfural and N-(6-benzothiazolyl)hydroxylamine there was obtained α-(5-nitro-2-furyl)-N-(6-benzothiazolyl)nitrone (compound 42) as orange needles melting at 215–216° C. with decomposition.

From 5-nitrofurfural and N-(6-methoxy-8-quinolyl) hydroxylamine there was obtained α-(5-nitro-2-furyl)-N-(6-methoxy-8-quinolyl)nitrone (compound 43) as yellow needles melting at 204–205° C. with decomposition.

From 5-nitrofurfural and N-(1-methyl-2-nitroethyl)hydroxylamine there was obtained α-(5-nitro-2-furyl)-N-(1-methyl-2-nitroethyl)nitrone (compound 44) as yellow scales melting at 111–112° C.

From 5-nitrofurfural and N-(2-sodioxysulfonylpropyl) hydroxylamine there was obtained α-(5-nitro-2-furyl)-N-(2-sodioxysulfonylpropyl)nitrone (compound 45) as yellow powder melting at 200–203° C. with decomposition.

EXAMPLES 46–50

Following compounds were further prepared from the given reactants by the same method as described in Example 31.

From β-(5-nitro-2-furyl)acrolein and N-(1-hydroxymethylethyl)hydroxylamine hydrochloride there was obtained α-[2-(5-nitro-2-furyl)vinyl] - N-(1-hydroxymethylethyl)nitrone (compound 46) as reddish orange needles melting at 182–183° C.

From β-(5-nitro-2-furyl)acrolein and N-(2-hydroxyethyl)hydroxylamine hydrochloride there was obtained α-[2-(5-nitro-2-furyl)vinyl] - N-(2-hydroxyethyl)nitrone (compound 47) as reddish orange needles melting at 190–191.5° C. with decomposition.

From β-(5-nitro-2-furyl)acrolein and N-(1,1-dihydroxymethyl - 2-hydroxyethyl)hydroxylamine hydrochloride there was obtained α-[2-(5-nitro-2-furyl)vinyl]-N-(1,1-dihydroxymethyl-2-hydroxyethyl)nitrone (compound 48) as reddish orange needles melting at 198–199° C.

From β-(5-nitro-2-furyl)acrolein and N-(2-hydroxypropyl)hydroxylamine hydrochloride there was obtained α-[2-(5-nitro - 2 - furyl)vinyl] - N - (2-hydroxypropyl)nitrone (compound 49) as reddish orange scales melting at 171–172° C.

From β-(5-nitro-2-furyl)acrolein and N-(1,1-dimethyl-2-hydroxyethyl)hydroxylamine hydrochloride there was obtained α-[2-(5-nitro - 2-furyl)vinyl]-N-(1,1-dimethyl-2-hydroxyethyl)nitrone (compound 50) as reddish orange scales melting at 174–175° C.

EXAMPLES 51–54

Following compounds were further prepared from the given reactants by the same method as described in Example 32.

From β-(5-nitro-2-furyl) acrolein and N-(6-benzothiazolyl)hydroxylamine there was obtained α-[2-(5-nitro-2-furyl)vinyl]-N-(6-benzothiazolyl)nitrone (compound 51) as red needles melting at 218–219° C. with decomposition From β-(5-nitro-2-furyl)acrolein and N-(4-sulfamoylphenyl)hydroxylamine there was obtained α-[2-(5-nitro-2-furyl)vinyl]-N-(4-sulfamoylphenyl)nitrone (compound 52) as yellow needles melting at 200–203° C. with decomposition.

From β-(5-nitro-2-furyl)acrolein and N-(5-benzimidazolyl)hydroxylamine there was obtained α-[2-(5-nitro-2-furyl)vinyl] - N-(5-benzimidazolyl)nitrone (compound 53) as red needles melting at 205° C. with decomposition.

From β-(5-nitro-2-furyl)acrolein and N-(6-quinolyl) hydroxylamine there was obtained α-[2-(5-nitro-2-furyl) vinyl]-N-(6-quinolyl) nitrone (compound 54) as red needles melting at 200–201° C. with decomposition.

EXAMPLE 55

A solution of 2.12 g. of 5-nitrofurfural and 3.04 g. of N-(1,1-dimethyl - 2 - dimethylaminoethyl)hydroxylamine hydrochloride in 30 ml. of ethanol was stirred for 20 minutes at room temperature. The precipitating crystals were collected by filtration, and dissolved in 3 ml. of water. The solution was made alkaline by adding thereto a saturated aqueous solution of sodium hydrogen carbonate, and the precipitating crystals were collected by filtration, washed with water and recrystallized from a mixed liquor of isopropyl alcohol and n-hexane to obtain 0.6 g. of α-(5-nitro-2-furyl)-N-(1,1-dimethyl-2-dimethyl-aminoethyl) nitrone (compound 55) as yellow needles melting at 114–115° C.

EXAMPLE 56

To a solution of 2.76 g. of 5-nitrofurfural and 6.14 g. of N-(1,1-dimethyl-2-piperidinoethyl)hydroxylamine hydrochloride in 20 ml. of ethanol was added 1.64 g. of anhydrous sodium acetate. The mixture was stirred for 6 hours at room temperature and for succeeding 4 hours at 65–70° C. The ethanol was removed by reduced pressure distillation. To the residue was added 20 ml. of 5% hydrochloric acid, and the resulting acidic solution was washed with ethanol and made alkaline with a saturated aqueous solution of sodium hydrogencarbonate. The precipitating crystals were collected by filtration, washed with water and recrystallized from a mixed liquor of ether and n-hexane to obtain 1.0 g. of α-(5-nitro-2-furyl)-N-(1,1-dimethyl-2-piperidinoethyl)nitrone (compound 56) as yellow prisms melting at 82–83° C.

EXAMPLE 57

To a solution of 1.41 g. of 5-nitrofurfural and 2.54 g. of N - (1,1-dimethyl-2-morpholinoethyl) hydroxylamine hydrochloride in 15 ml. of ethanol was added 1.64 g. of anhydrous sodium acetate, and the reaction was conducted at room temperature for 4 hours. To the reaction mixed liquor was added 50 ml. of water, and the precipitating crystals were collected by filtration, washed with water and recrystallized from isopropyl alcohol to obtain 0.7 g. of α - (5-nitro-2-furyl)-N-(1,1-dimethyl-2-morpholinoethyl)nitrone (compound 57) as yellow needles melting at 120–121° C.

EXAMPLE 58

A solution of 2.12 g. of 5-nitrofurfural and 3.28 g. of N - (2 - isopropylamine-1,1-dimethylethyl)hydroxylamine hydrochloride in 15 ml. of ethanol was stirred for 1 hour at room temperature. The precipitating yellow crystals were recrystallized from a mixed liquor of methanol and ethanol to obtain 1.66 g. of α-(5-nitro-2-furyl)-N - (2-isopropylamine-1,1-dimethylethyl)nitrone hydrochloride (compound 58) as yellow needles melting at 218–220° C. with decomposition.

EXAMPLE 59

To a solution of 1.41 g. of 5-nitrofurfural and 4.3 g. of N-(2-aniline-1,1-dimethylethyl)hydroxylamine hydrochloride in 20 ml. of ethanol was added 1.64 g. of anhydrous sodium acetate, and the mixture was stirred for 5 hours at room temperature. The precipitating crystals were collected by filtration, washed with water and recrystallized from isopropyl alcohol to obtain 0.3 g. of α-(5 - nitro-2-furyl)-N-(2-anilino-1,1-dimethylethyl)nitrone (compound 59) as yellow needles melting at 142–143° C.

EXAMPLE 60

To a solution of 1.12 g. of 5-nitrofurfural and 2 g. of N-[1,1 - dimethyl - 2 - (3-pyridylamino)ethyl]hydroxylamine hydrochloride in 10 ml. of isopropyl alcohol was added 0.8 g. of anhydrous sodium acetate. The mixture was stirred for 2 hours at room temperature, and the solvent was removed by reduced pressure distillation. The residue was dissolved in 10 ml. of 10% hydrochloric acid, and the resulting solution was washed with ether and made alkaline by adding thereto a saturated aqueous solution of sodium hydrogencarbonate. The precipitating crystals were collected by filtration, washed with water and recrystallized from benzene to obtain 0.85 g. of α-(5-nitro - 2 - furyl) - N-[1,1-dimethyl-2-(3-pyridylamino)-ethyl]nitrone (compound 60) as yellow needles melting at 134–135° C.

EXAMPLE 61

A solution of 1.67 g. of β-(5-nitro-2-furyl) acrolein and 2.18 g. of N - (2-isopropylamino-1,1-dimethylethyl)hydroxylamine hydrochloride in 20 ml. of ethanol was stirred for 2 hours at room temperature and for succeeding 6 hours at 60° C. The precipitating orange crystals were recrystallized from a mixed liquor of isopropyl alcohol and n-hexane to obtain 0.3 g. of α-[2-(5-nitro-2-furyl)vinyl] - N-(2-isopropylamino-1,1-dimethyl-ethyl)-nitrone hydrochloride (compound 61) as orange needles melting at 195–197° C. with decomposition.

EXAMPLE 62

The present example explains the excellent antimicrobial activities of the compound of the present invention on the basis of the results of in vitro experiments. The compounds in accordance with this invention exhibit especially strong in vitro activities against Gram-positive bacteria such as *Staphylococcus aureus* and *Mycobacterium tuberculosis*; Gram-negative bacteria such as *Escherichia coli* and *Shigella flexneri;* fungi such as *Candida albicans* and Trichophyton asteroides and protozoa such as *Trichomonas vaginalis.*

The following Table I summarizes the activities in vitro of the compounds of this invention against a variety of micro-organisms. The minimum inhibitory concentration (MIC) was determined by the well-known serial dilution technique.

In all the following tables, compounds Nos. 1 to 61 are those so identified in the examples, and compounds Nos. 62 to 64 are controls, which structures are similar to that of the compounds of this invention, as follows:

Compound No. 62.—2-(5-nitro-2-furfurylidene)aminothiazole.

Compound No. 63.—N - (5-nitro-2-furfurylidene)-3-acetylaniline.

Compound No. 64.—6 - methoxy - 8-(5-nitro-2-furfurylidene)aminoquinoline.

TABLE I

[MIC: mcg./ml.]

| Compound No. | 1 | 2 | 3 | 4 | 5 | 6 | 7 | 8 | 9 | 10 | 11 | 12 | 13 | 16 |
|---|---|---|---|---|---|---|---|---|---|---|---|---|---|---|
| Organisms: | | | | | | | | | | | | | | |
| *Staphylococcus aureus* | 3 | 10 | 10 | 30 | 1 | 1 | 3 | 10 | 3 | 3 | 10 | 10 | 1 | 10 |
| *Mycobacterium tuberculosis* | 10 | 10 | 10 | 30 | 30 | 10 | 10 | 30 | 10 | 3 | 3 | ----- | 10 | 10 |
| *Escherichia coli* | 1 | 3 | 10 | 10 | 3 | 1 | 3 | 3 | 10 | 3 | 30 | 30 | 3 | 10 |
| *Shigella flexneri* | 1 | 3 | 10 | 10 | 3 | 1 | 3 | 10 | 10 | 10 | 30 | 30 | 30 | 10 |
| *Candida albicans* | 1 | 10 | 10 | 30 | >100 | 100 | 100 | >100 | 10 | 1 | 10 | 30 | 3 | 10 |
| *Trichophyton asteroides* | 30 | 30 | 30 | 30 | >100 | 100 | >100 | >100 | 30 | 10 | 10 | 10 | 10 | 10 |
| *Trichomonas vaginalis* | 0.1 | 0.3 | 1 | 1 | 1 | 1 | 1 | 30 | 3 | 3 | 10 | 3 | 3 | 3 |

| Compound No. | 19 | 23 | 24 | 25 | 26 | 30 | 33 | 52 | 54 | 46 | 57 | 60 | 61 | 62 | 63 | 64 |
|---|---|---|---|---|---|---|---|---|---|---|---|---|---|---|---|---|
| Organisms: | | | | | | | | | | | | | | | | |
| *Staphylococcus aureus* | 10 | 10 | 10 | 10 | 1 | 10 | 3 | 3 | 0.3 | 1 | 30 | 30 | 3 | 100 | 100 | 100 |
| *Mycobacterium tuberculosis* | 10 | 3 | 3 | 10 | ----- | 10 | 3 | 3 | 1 | 10 | >100 | 30 | 10 | 10 | 30 | 30 |
| *Escherichia coli* | 30 | 30 | 10 | 30 | 1 | 10 | 1 | 3 | 30 | 1 | 100 | 30 | 10 | 100 | 30 | 100 |
| *Shigella flexneri* | 30 | 10 | 10 | 30 | 1 | 10 | 1 | ----- | ----- | ----- | 100 | 100 | 10 | 30 | 30 | 100 |
| *Candida albicans* | 100 | 100 | 30 | >100 | >100 | 100 | 100 | >100 | >100 | >100 | 100 | >30 | >30 | 100 | 100 | >100 |
| *Trichophyton asteroides* | 30 | 30 | 10 | 30 | 30 | 10 | 30 | 10 | 100 | 100 | 10 | >30 | 30 | 100 | 100 | >100 |
| *Trichomonas vaginalis* | 10 | 10 | 10 | 10 | 10 | 30 | 0.3 | 30 | 1 | 10 | 3 | 3 | 30 | 30 | 30 | 100 |

EXAMPLE 63

The present example explains the excellent antimicrobial activities of the compound of the present invention on the basis of the results of in vivo experiments.

The Table II and Table III summarize in vivo activities of the compound against infection with *Salmonella typhimurium* and *Trichomonas vaginalis* in mice.

Infection with *Salmonella typhimurium*

10 mice of each group were infected intraperitoneally with 0.5 ml. of a bacterial suspension containing 1000 $LD_{50}$ of *Salmonella typhimurium.* 12.5, 25 and 50 mg./kg. of a compound to be tested were administered orally twice a day for 4 days, the first treatment being made immediately after the infection. After 2 weeks' observation, efficacy was expressed by survival rate (survived/tested). The results are shown in Table II.

TABLE II

| Compound No. | 1 | 2 | 3 | 5 | 6 | 7 | 8 | 33 | 46 |
|---|---|---|---|---|---|---|---|---|---|
| Dose: | | | | | | | | | |
| 50 mg./kg. | 10/10 | 7/10 | 5/10 | 9/10 | 10/10 | 8/10 | 10/10 | 10/10 | 8/10 |
| 25 mg./kg. | 8/10 | 1/10 | | 8/10 | 10/10 | 5/10 | 8/10 | 10/10 | |
| 12.5 mg./kg. | 2/10 | 1/10 | | 3/10 | 4/10 | 2/10 | 3/10 | 9/10 | |
| Non-treated control | | 0/10 | | | | | | | |

Infection with *Trichomonas vaginalis*

6 mice of each group were infected intraperitoneally with 0.1 ml. of a protozoal (*Trichomonas vaginalis*) suspension containing $10^7$ cells and administered orally 125 and 250 mg./kg. of a compound to be tested once at 1 hour after the infection. On the 7th day after the infection, mice were sacrificed and the presence of viable protozoa in abscesses produced in intraperitoneal cavity was examined by cultivation. The results are shown in Table III.

TABLE III

| Compound No. | 1 | 2 | 3 | 4 | 5 | 6 | 7 | 8 | 10 | 13 | 16 | 33 | 46 | 55 | 57 | 59 |
|---|---|---|---|---|---|---|---|---|---|---|---|---|---|---|---|---|
| Dose: | | | | | | | | | | | | | | | | |
| 250 mg./kg. | *5/5 | 4/5 | 3/5 | 3/5 | 3/5 | 2/5 | 2/5 | 3/5 | 2/5 | 3/5 | 4/5 | 5/6 | 5/6 | 4/6 | 6/6 | 4/6 |
| 125 mg./kg. | 2/5 | 3/5 | | | | | | | | | 2/5 | 5/6 | | | 3/6 | |
| Non-treated control | | 0/5 | | | | | | | | | | | | | | |

* Mice having no viable protozoa/mice tested.

While the present invention has been described primarily with respect to the foregoing specific examples, it is to be understood that the present invention is in no way to be deemed as limited thereto.

We claim:

1. A nitrone derivative of the formula $$O_2N-\underset{\text{(furan)}}{\left[\;\right]}-(CH=CH)_n-\underset{\substack{|\\H}}{C}=\overset{\substack{O\\|}}{N}-R \qquad (I)$$

wherein $n$ is 0 or 1; R represents a member selected from the group consisting of A—X, $A'(OH)_m$, $P—(Y)_q$ and a heterocyclic radical selected from quinolyl, methoxy-substituted quinolyl, benzimidazolyl, benzotriazolyl and benzothiazolyl; wherein A and A' are each alkyl having 1 to 6 carbon atoms; P is phenyl; X is a member selected from the group consisting of hydrogen, phenyl, halogen, alkoxy of 1 to 4 carbon atoms; alkoxy-carbonyl in which the alkoxy portion has 1 to 4 carbon atoms, carbamoyl, nitro, sulfoxyl, alkali metal oxysulfonyl, pyridyl and an amino radical of the formula $$-N\begin{matrix} \diagup R_2 \\ \diagdown R_3 \end{matrix} \qquad (II)$$

in which $R_2$ and $R_3$ each are a member selected from the group consisting of hydrogen, alkyl having 1 to 4 carbon atoms, and phenyl, or $R_2$ and $R_3$ may together with the nitrogen atom of said amino be piperidino and morpholino; Y is a member selected from the group consisting of hydrogen, alkyl having 1 to 4 carbon atoms, halogen, hydroxyl, OM where M is an alkali metal, alkanoyloxy having 1 to 4 carbon atoms, benzoyloxy, salicoyloxy alkoxy having 1 to 4 carbon atoms, alkanoyl having 1 to 4 carbon atoms, alkanoylamino having 1 to 4 carbon atoms, carboxyl, alkali metal salt of carboxyl, alkoxy-carbonyl having 1 to 4 carbon atoms, carbamoyl, phenyl-substituted carbamoyl, alkyl-substituted carbamoyl wherein the alkyl has 1 to 4 carbon atoms, sulfamoyl, sulfoxyl, cyano and trifluoromethyl; $m$ is an integer of 1 to 3; and $q$ is an integer of 1 or 2.

2. The nitrone derivative of claim 1 wherein said derivative is α-(5-nitro-2-furyl)-N-methylnitrone.

3. The nitrone derivative of claim 1 wherein said derivative is α-(5-nitro-2-furyl)-N-ethylnitrone.

4. The nitrone derivative of claim 1 wherein said derivative is α-(5-nitro-2-furyl)-N-propylnitrone.

5. The nitrone derivative of claim 1 wherein said derivative is α-(5-nitro-2-furyl)-N-isopropylnitrone.

6. The nitrone derivative of claim 1 wherein said derivative is α-(5-nitro-2-furyl - N - (1-methyl-2-hydroxyethyl)nitrone.

7. The nitrone derivative of claim 1 wherein said derivative is α-(5-nitro-2-furyl)-N-(2-hydroxyethyl)nitrone.

8. The nitrone derivative of claim 1 wherein said derivative is α-(5-nitro-2-furyl)-N-[2-hydroxy-1-(hydroxymethyl)ethyl]nitrone.

9. The nitrone derivative of Claim 1 wherein said derivative is α-(5-nitro-2-furyl)-N-phenylnitrone.

10. The nitrone derivative of claim 1 wherein said derivative is α-(5-nitro-2-furyl)-N-(4-methoxyphenyl)nitrone.

11. The nitrone derivative of claim 1 wherein said derivative is α-(5-nitro-2-furyl) - N - (3-methoxyphenyl) nitrone.

12. The nitrone derivative of claim 1 wherein said derivative is α-(5-nitro-2-furyl)-N-(2-methoxyphenyl) nitrone.

13. The nitrone derivative of claim 1 wherein said derivative is α-(5-nitro-2-furyl) - N - (4-ethoxyphenyl)nitrone.

14. The nitrone derivative of claim 1 wherein said derivative is α-(5-nitro-2-furyl)-N-(4-tolyl)nitrone.

15. The nitrone derivative of claim 1 wherein said derivative is α - (5-nitro-2-furyl)-N-(3-trifluoromethylphenyl)nitrone.

16. The nitrone derivative of claim 1 wherein said derivative is α-(5-nitro - 2- furyl)-N-(4-chlorophenyl) nitrone.

17. The nitrone derivative of claim 1 wherein said derivative is α-(5-nitro-2-furyl)-N-(3,4-dichlorophenyl) nitrone.

18. The nitrone derivative of claim 1 wherein said derivative is α-(5-nitro - 2 - furyl)-N-(4-iodophenyl) nitrone.

19. The nitrone derivative of claim 1 wherein said derivative is α-(5-nitro-2-furyl)-N-(4-carboxyphenyl) nitrone.

20. The nitrone derivative of claim 1 wherein said derivative is α-(5-nitro-2-furyl)-N-(3-carboxyphenyl) nitrone.

21. The nitrone derivative of claim 1 wherein said derivative is α-(5-nitro-2-furyl)-N-(2-carboxyphenyl) nitrone.

22. The nitrone derivative of claim 1 wherein said derivative is α-(5-nitro-2-furyl)-N-(4-methoxycarbonylphenyl)nitrone.

23. The nitrone derivative of claim 1 wherein said derivative is α-(5-nitro-2-furyl)-N-(4-carbamoylphenyl) nitrone.

24. The nitrone derivative of claim 1 wherein said derivative is α-(5-nitro-2-furyl)-N-(4-cyanophenyl) nitrone.

25. The nitrone derivative of claim 1 wherein said derivative is α-(5-nitro-2-furyl)-N-(4-sulfamoylphenyl) nitrone.

26. The nitrone derivative of claim 1 wherein said derivative is α-(5-nitro-2-furyl)-N-(5-benzimidazolyl) nitrone.

27. The nitrone derivative of claim 1 wherein said derivative is α-(5-nitro-2-furyl)-N-(6-quinolyl)nitrone.

28. The nitrone derivative of claim 1 wherein said derivative is α-(5-nitro-2-furyl)-N-(4-sodioxycarbonylphenyl)nitrone.

29. The nitrone derivative of claim 1 wherein said derivative is α-(nitro-2-furyl)-N-(4-salicyloyloxyphenyl) nitrone.

30. The nitrone derivatives of claim 1 wherein said derivative is α-(5-nitro-2-furyl)-N-(5-benzotriazolyl) nitrone.

31. The nitrone derivative of claim 1 wherein said derivative is α - [2-(5-nitro-2-furyl)vinyl]-N-methylnitrone.

32. The nitrone derivative of claim 1 wherein said derivative is α-[2-(5-nitro-2-furyl)vinyl]-N-(3-carboxyphenyl)nitrone.

33. The nitrone derivative of claim 1 wherein said derivative is α-[2-(5-nitro-2-furyl)vinyl]-N-(1-hydroxymethylethyl)nitrone.

34. The nitrone derivative of claim 1 wherein said derivative is α-[2-(5-nitro-2-furyl)vinyl]-N-(2-hydroxyethyl)nitrone.

35. The nitrone derivative of claim 1 wherein said derivative is α-[2-(5-nitro-2-furyl)vinyl]-N-(4-sulfamoylphenyl)nitrone.

36. The nitrone derivative of claim 1 wherein said derivative is α-[2-(5-nitro-2-furyl)vinyl]-N-6-quinoyl) nitrone.

37. The nitrone derivative of claim 1 wherein said derivative is α-(5-nitro-2-furyl)-N-(1,1-dimethyl-2-dimethylaminoethyl)nitrone.

38. The nitrone derivative of claim 1 wherein said derivative is α-(5-nitro - 2 - furyl)-N-(1,1-dimethyl-2-morpholinoethyl)nitrone.

39. The nitrone derivative of claim 1 wherein said derivative is α-(5-nitro - 2 - furyl)-N-(2-anilino-1,1-dimethylethyl)nitrone.

40. The nitrone derivative of claim 1 wherein said derivative is α-(5-nitro-2-furyl)-N-[1,1-dimethyl-2-(3-pyridylamino)ethyl]nitrone.

41. The nitrone derivative of claim 1 wherein said derivative is α-[2-(5-nitro-2-furyl)vinyl]-N-(2-isopropylamino-1,1-dimethylethyl)nitrone.

42. A compound of the formula

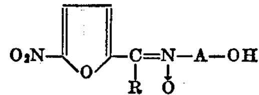

wherein R is hydrogen or alkyl of 1 to 4 carbon atoms and A is alkyl of 1 to 6 carbon atoms.

References Cited

FOREIGN PATENTS 952,895 11/1956 Germany ........ 260—240 G

ALEX MAZEL, Primary Examiner

B. DENTZ, Assistant Examiner

U.S. Cl. X.R.

260—289, 293.58, 247.7 A, 308, 309.2, 346.1, 347.2, 347.3, 347.5, 347.8; 424—232, 263, 267, 269, 273, 274, 285